United States Patent
K et al.

(10) Patent No.: US 11,928,627 B2
(45) Date of Patent: Mar. 12, 2024

(54) WORKFLOW MANAGER

(71) Applicant: SAP SE, Walldorf (DE)

(72) Inventors: Srinath K, Dharmapuri (IN); Sahana M D, Bangalore (IN)

(73) Assignee: SAP SE, Walldorf (DE)

( * ) Notice: Subject to any disclaimer, the term of this patent is extended or adjusted under 35 U.S.C. 154(b) by 293 days.

(21) Appl. No.: 17/528,893

(22) Filed: Nov. 17, 2021

(65) Prior Publication Data
US 2023/0153723 A1 May 18, 2023

(51) Int. Cl.
*G06F 16/33* (2019.01)
*G06F 9/54* (2006.01)
*G06Q 10/0633* (2023.01)

(52) U.S. Cl.
CPC .......... *G06Q 10/0633* (2013.01); *G06F 9/54* (2013.01); *G06F 16/3344* (2019.01)

(58) Field of Classification Search
None
See application file for complete search history.

(56) References Cited

U.S. PATENT DOCUMENTS 11,797,338 B2* 10/2023 Shiraki ............... G06F 16/27
2023/0330846 A1* 10/2023 Zhou ................... G06N 3/084

* cited by examiner

*Primary Examiner* — Craig C Dorais
(74) *Attorney, Agent, or Firm* — Mintz Levin Cohn Ferris Glovsky and Popeo, P.C.

(57) ABSTRACT

A method, a system, and a computer program product for generating and/or using one or more workflow managers in computing systems. A request to generate a computing workflow is received. The workflow includes a plurality of computing functions. A plurality of configuration parameters associated with the workflow are determined based on the received request. The configuration parameters define a configuration of execution of one or more functions. One or more connection objects for connecting the functions to one or more data sources storing data required for execution of the functions are identified. The plurality of functions are arranged for execution in a predetermined order using the determining plurality of configuration parameters and identified connection objects. The predetermined order is specified using one or more configuration parameters. The workflow is generated, compiled and executed.

20 Claims, 9 Drawing Sheets

WORKFLOW MANAGER

TECHNICAL FIELD

This disclosure relates generally to data processing and, in particular, to generation and/or use of one or more workflow managers in computing systems.

BACKGROUND

In today's world, many companies rely on software applications to conduct their business. Software applications deal with various aspects of companies' businesses, which can include finances, product development, human resources, customer service, management, and many other aspects. Software applications typically use various forms of content, data, and/or other software applications for specific operational purposes. Such content, data, and/or other software applications may need to be connected to allow for an uninterrupted operation as well as generation of desired results. Typical end users may be unaware of which functionalities, data, interfaces, etc. may be needed to accomplish a particular task. Thus, it is important to provide an easy way to locate and configure those without consuming time, resources and expense.

SUMMARY

In some implementations, the current subject matter relates to a computer implemented method for generating and/or using one or more workflow managers in computing systems. The method may include receiving a request to generate a computing workflow, where the workflow may include a plurality of computing functions, and determining, based on the received request, a plurality of configuration parameters associated with workflow, where the plurality of configuration parameters may define a configuration of execution of one or more functions in the plurality of functions. The method may further include identifying one or more connection objects for connecting the functions to one or more data sources storing data required for execution of the functions, and arranging, using the determining plurality of configuration parameters and identified one or more connection objects, the plurality of functions for execution in a predetermined order, where the predetermined order may be specified using one or more configuration parameters in the plurality of configuration parameters. The method may also include generating, based on the arranging, the workflow, and compiling the generated workflow, and executing the compiled workflow.

In some implementations, the current subject matter may include one or more of the following optional features. The method may include validating each configuration parameter in the plurality of configuration parameters.

In some implementations, the method may be configured to perform assigning a start identifier and an end identifier to the generated workflow. This process may be performed upon completion of validation/verification of the configuration parameters.

Each configuration parameter may be configured to include a key-value pair. A key in the key-value pair may identify one or more computing functions in the plurality of computing functions. A value in the key value pair may identify one or more values associated with execution of the one or more computing functions.

In some implementations, the request may be received using at least one of the following: a query, a free text query, a natural language processing query, a workflow identifier, and any combination thereof. The generated workflow may be stored as a template workflow. The method may include executing the template workflow in response to receiving another request to generate another computing workflow.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
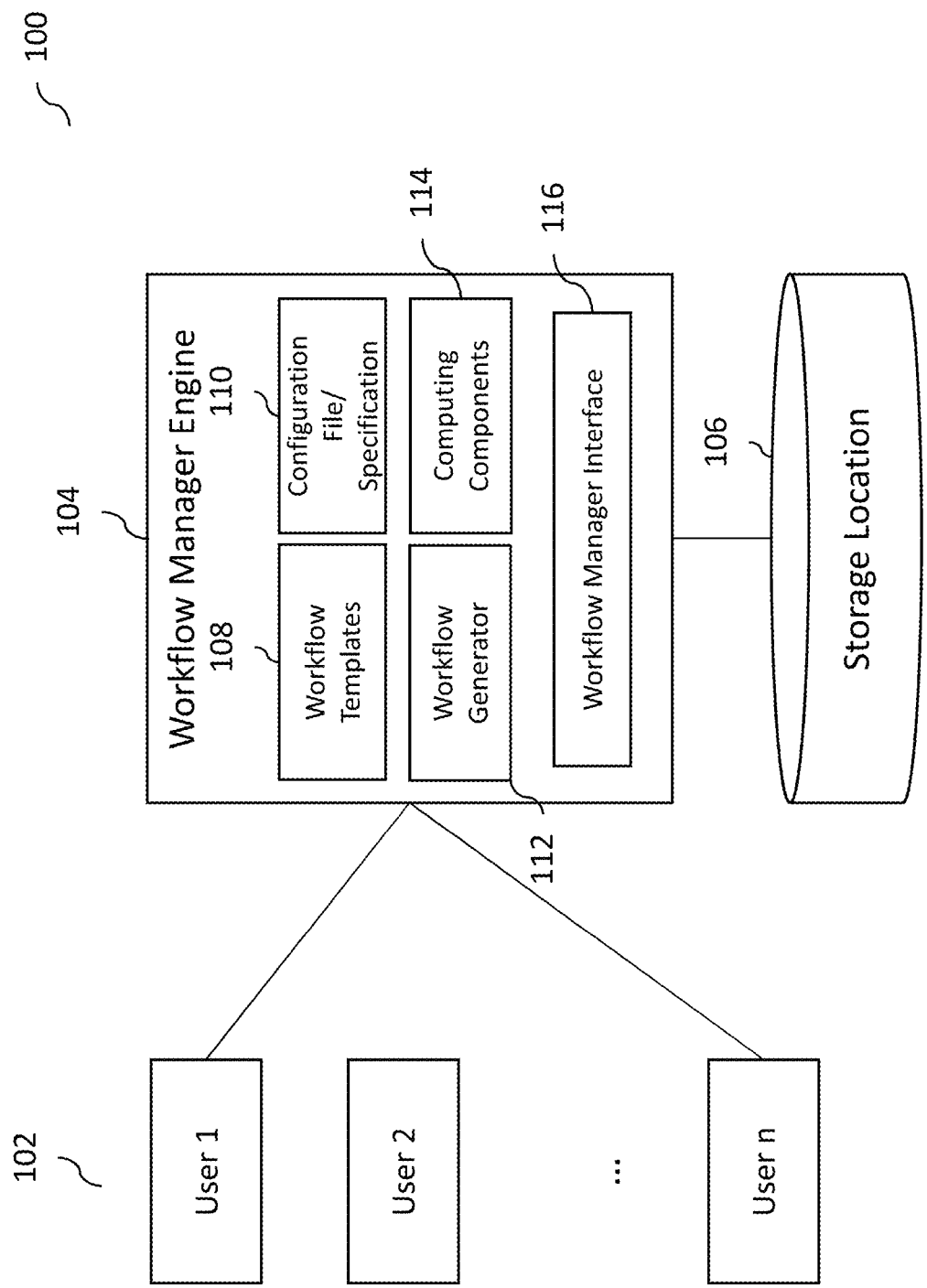
FIG. 1 illustrates an exemplary system for generating of workflows in computing systems, software applications, etc., according to some implementations of the current subject matter.

To address the deficiencies of currently available solutions, one or more implementations of the current subject matter provide for an ability to provide for generation and/or use of one or more workflow managers in computing systems.

Companies use a plurality of processes, applications and/or services in their operations. Processes, applications and/or services may be programs that an end-user runs to accomplish certain tasks and may work in conjunction with one or more back-end systems, which may store the data to be worked on, such as, for example, objects and other data, as well as logic for manipulating the data, such as for example transactions or other logic. Examples of back-end systems may include database systems, enterprise resource planning ("ERP") systems, and customer relationship management ("CRM") systems.

Such systems typically have a specific computing system landscape, content delivery capabilities and/or implementation aspects. Each of these have various issues that may be associated with them. For example, computing systems landscape can become increasing fragmented and complex with addition of new computing components, entities, data processes, etc. Existing and/or legacy systems may need to be integrated and/or constantly upgraded to ensure that there is interoperability with newly added computing components, computing systems, workflows, etc. To ensure that there is interoperability between different computing solutions, systems, components, etc., a manual effort in re-wiring integrations may be required, which results in a loss of any custom-developed content, increase in total cost of ownership, time delays, etc.

In various systems (e.g., supply chain, procurement, etc.), such as a software as a service (SaaS) system, a combination of legacy systems and microservices may be built and provided to serve various business objectives. Data from the combination of the legacy systems and the microservices may be consumed by a user interface (UI) or via an application program interface (API) gateway. The resulting data may, for example, be used for direct user interactions and report generation, and/or the resulting data may be pushed into a data pipeline and consumed by several downstream consumers.

Microservices may typically have flexible architectures in which various programming languages, frameworks, and storage structures may be utilized to fulfill one or more functionalities. In a multi-tenanted SaaS system, for example, one or more microservices may combine with one or more legacy systems or applications. Various microservices may be added to augment existing services or provide new services, and each microservice may have its own programming language and/or backend technology. Similarly, various legacy systems or applications may be added for additional services. Each of these micro-services and legacy applications may be independent from one another with different business functionalities, resulting in data being spread apart across the micro-services and legacy applications.

Further, microservice systems/architecture can be designed to perform various independent tasks with reliable and rapid outcome. Such systems/architectures can be self-contained to handle various aspects of software development, such as, for example, load balancing, fail-over, memory management, and others. Cloud-based applications typically leverage microservice systems/architecture to fulfil various computing requirements.

In most cases, more than one microservice may be needed to complete a particular end-to-end workflow. For example, in cloud systems (e.g., SAP Analytics Cloud, as available from SAP SE, Walldorf, Germany), in order to generate a "story" (e.g., a computing process flow) and/or a dashboard, a particular dataset may need to be generated as a prerequisite of that story/dashboard and/or for use by the story/dashboard. The dataset may need to be associated with a "connection", which can refer to an object that can provide a way for the story/dashboard to connect to a data source that can store and/or include the particular dataset. Thus, prior to performing the end-to-end workflow, any such prerequisites must be resolved. In some cases, it might not be possible for users of such end-to-end workflows to know all required prerequisites, dependencies, etc. and resolving those typically would consume a substantial time and effort.

In some implementations, the current subject matter may be configured to provide a workflow manager that may be configured to resolve such required prerequisites, dependencies, etc. prior to the execution of a specific end-to-end workflow. The workflow manager may be configured as a plug-in (into the existing computing system), a standalone application, functionality, tool, and/or any other combination of hardware and/or software.

The workflow manager may be configured to provide a runtime environment for executing a sequence of tasks of the end-to-end workflow. Such tasks may be executed in synchronous, asynchronous, and/or any other desired manner. The workflow manager may be configured to receive, as an input, one or more configuration files for generating a particular end-to-end workflow. One or more workflows may be executed at the same time using the workflow manager. Alternatively, or in addition to, the workflows may be executed, using the workflow manager, in a particular execution order. The workflow manager may also be configured to provide for external communications, such as, for example, query execution, invoking application programming interface (API) calls, etc.

In some implementations, the workflow manager may be configured to generate a user interface that may allow dragging and dropping of various functionalities, computing applications, etc. for the purposes of generating a particular workflow. The user interface may include one or more graphical panels that may include a listing of workflows and/or components (e.g., partial workflows, functionalities, computing blocks, data, metadata, etc.) of workflows that may be available for selection. The user interface may also include a "canvas" area that may be used generation of a workflow. One or more users may use the user interface to perform various functionalities associated with generation of a desired workflow. The workflow manager may be configured to provide one or more templates (e.g., pre-defined structures) for generating a portion and/or an entire a workflow.

By way of a non-limiting example, using the user interface of the workflow manager, users may select one or more pre-defined workflows from one or more user interface panels and then drag-and-drop the workflows into workflow manager's canvas area. In some implementations, the workflow manager may be configured to provide a compiling functionality of the generated workflow to ensure that when the generated workflow is put in a production environment, it will operate in accordance with its requirements and/or any requirements of computing systems where the generated workflow will be implemented.

In some implementations, the workflow manager may be communicatively coupled to a temporary storage location (e.g., a cache, a memory location, etc.) to store result(s) of compiling of each process, workflow, etc. of the generated workflow, process and store data that may result from execution of one workflow in the generated workflow before executing the subsequent workflows, and/or store any other data. The temporary storage location may be configured to store results of execution of one or more or a chain of generated workflows, where one workflow may require resulting data from execution of another workflow (either within a particular generated workflow or between generated workflows).

FIG. 1 illustrates an exemplary system 100 for generating of workflows in computing systems, software applications, etc., according to some implementations of the current subject matter. The system 100 may be configured to operate in one or more clustered computing environments (e.g., Kubernetes), one or more cloud environments, etc. It may include one or more users, entities, applications, etc. 102 (e.g., user 1, user 2, . . . , user n, etc.), a workflow manager engine/system 104, and a database 106. The engine 104 may include one or more computing elements (which may, for example, as discussed below, include one or more processors, one or more servers, one or more computing engines, one or more memory and/or storage locations, one or more databases, etc.) such as, workflow templates 108, configuration specification(s) 110, workflow generator 112, computing components 114, and workflow manager interface 116. In generating a workflow for an end user 102, one or more of the computing elements in the engine 104 may be used.

The workflow manager engine 104 may include a processor, a memory, and/or any combination of hardware/software, and may be configured to generate a workflow that a user 102 may wish to generate and/or use. A workflow may refer to one or more or specific software applications, one or more computing processes, one or more computing steps that may be executed by one or more processors, along with any associated data and/or content, and/or any configuration data that may specify one or more functions and/or features of the software application(s), data and/or content for inclusion in a particular workflow. A workflow may include one or more other workflows (e.g., a larger workflow that may include one or more sub-workflows). In some cases, a workflow may be configured to rely on data, functions and/or features (and/or any combination thereof) of a computing component such that a workflow is an integration and/or a combination of one or more computing components. A computing component 114 may refer to a software code that may be configured to perform a particular function, a piece and/or a set of data (e.g., data unique to a particular user and/or data available to a plurality of users) and/or configuration data used to create, modify, etc. one or more software functionalities associated with a particular workflow, sub-workflow, and/or a portion of a workflow. The engine 104 may include one or more artificial intelligence and/or learning capabilities that may rely on and/or use various data, e.g., data related to and/or identifying one or more workflows that may have been previously generated.

The elements of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Moreover, the elements of the system 100 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

In some implementations, to generate a particular workflow, the engine 104 may be configured to receive a request from the user 102 concerning generation and/or use of one or more workflows. In some cases, the user 102 may already know specific workflow(s) which the user 102 may wish to use, and if such workflow already exists (e.g., stored in the storage location 106), the user 102 may utilize one or more functionalities (e.g., graphical tabs, buttons, etc.) of the workflow manager interface 114 to query, select and/or retrieve (e.g., from storage location 106) that workflow directly. If the workflow does not exist and/or the user 102 is unsure which workflow the user wishes to utilize, the user 102 may transmit a query (e.g., a search query) to the workflow manager engine 104, for example, via the workflow manager interface 116, seeking user-desired workflow (s).

The user 102 may be an end user (e.g., a business user), and/or an administrator user. The end user 102 may be configured to use any generated workflows for the various purposes (e.g., accounting, HR, procurement, production, etc.). The administrator user 102 may be configured to cause (e.g., via the workflow manager interface 116) generation one or more workflows using one or more workflow templates 108, one or more configuration parameters, one or more configuration specifications 110, and/or one or more computing components 114 that may include one or more configuration parameters. The configuration specification 110 may be configured to specify all computing components 114 that may be needed for generating the workflow. The configuration specification 110 may also specific one or more connection computing components (e.g., connection objects) 114 that may be needed for the purposes of connecting various computing components and/or data that may be stored at the storage location 106. The connection computing components 114 may include one or more application programming interfaces (APIs) that may be used for connection purposes.

Figure 2:
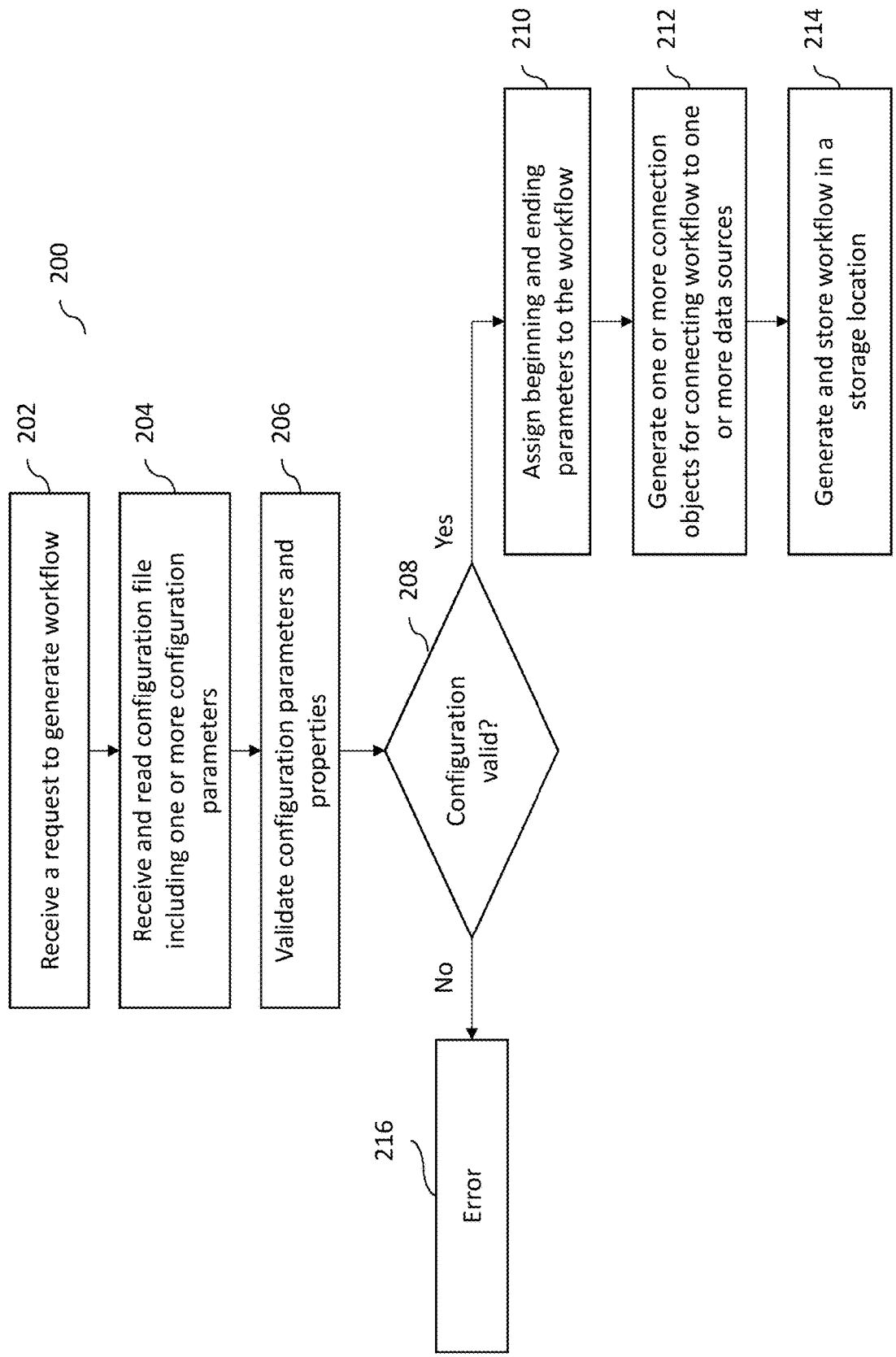
FIG. 2 illustrates an exemplary workflow generation process, according to some implementations of the current subject matter.

FIG. 2 illustrates an exemplary workflow generation process 200, according to some implementations of the current subject matter. The process 200 may be performed by the system 100 show in FIG. 1. In some implementation, an administrator user 102 may be configured to cause execution of the process 200 for the purposes of generating a workflow for a particular computing process.

At 202, a request to generate a workflow may be received. The request may be received from one or more user 102 and may be transmitted to the workflow manager engine 104, as shown in FIG. 1. Alternatively, or in addition, the request to generate a workflow may be transmitted to the engine 104 in any other desired fashion.

Once the request to generate a workflow is received, one or more configuration files/specifications 110 that may include one or more configuration parameters may be received and read, at 204. In some implementations, the configuration file 110 may be configured as a property file that may include one or more (e.g., a set of) key-value pairs. Each key in the key-value pair may be configured to represent one or more configuration parameters that may be required and/or used in the workflow. The corresponding value in the key-value pair may correspond to one or more values that a particular parameter may be assigned. Each key be extracted from the configuration file during the reading of the configuration file by the workflow manager engine 104. The keys may be mapped to specific procedures that may be executed by the engine 104 during generation of the workflow. In some implementations, the configuration file may be generated using one or more templates 108. The templates 108 may be configured to specify various configuration parameters and/or computing component 114 that may be used in generation of a workflow.

In some implementations, an administrator user 102 may be configured to generate a configuration file and upload it to the workflow manager engine 104. Alternatively, or in addition to, the configuration file may be generated automatically and/or provided to the workflow manager engine 104. The workflow manager engine 104 may be configured to read the configuration file and deploy the workflow in engine 104's workbench (e.g., an interface that may be used generation and/or using of a workflow).

Once the configuration file/specification 110 has been received and read, the configuration file 110 may be configured to be validated by the workflow engine manager 104, at 206. In particular, one or more and/or each of the configuration parameters may be verified by the engine 104. The configuration parameters may be selected for validation/verification. Validation/verification may be executed, for example, by performing a test execution of each of the parameters that may be selected for validation/verification. In some cases, an entire workflow that may have been generated using the configuration parameters may be validated/verified by performing a test execution of the workflow, at 208.

In some implementations, the configuration file may be configured to include one or more APIs (e.g., external APIs that may be required for connection to an external data source, database, an external computing component, application, etc.) that may be needed for a particular workflow. Each such API may be verified and/or authenticated to ensure that workflow relying on such API will be able to execute appropriate functions, calls, etc. In some cases, the workflow manager interface 116 may be configured to graphically/visually indicate failure and/or success of the above validation/verification/authentication processes. The verification/validation/authentication process may be used to resolve any dependencies among various computing components, data, etc. that may be involved in the workflow. Resolution of dependencies may be needed to ensure proper execution of workflow and/or any of its sub-workflow processes. One or more additional workflows may be generated during the verification/validation/authentication processes to allow for resolution of dependencies.

If the verification/validation/authentication of one or more parameters, APIs, etc. of the configuration file 110 fails, the workflow manager engine 104 may be configured to generate an error, at 216. The error may be graphically displayed by the workflow manager interface 116. The error may also specify where (e.g., specify configuration parameter, etc.) the error has occurred and/or what steps may need to be taken to resolve it.

Figure 3:
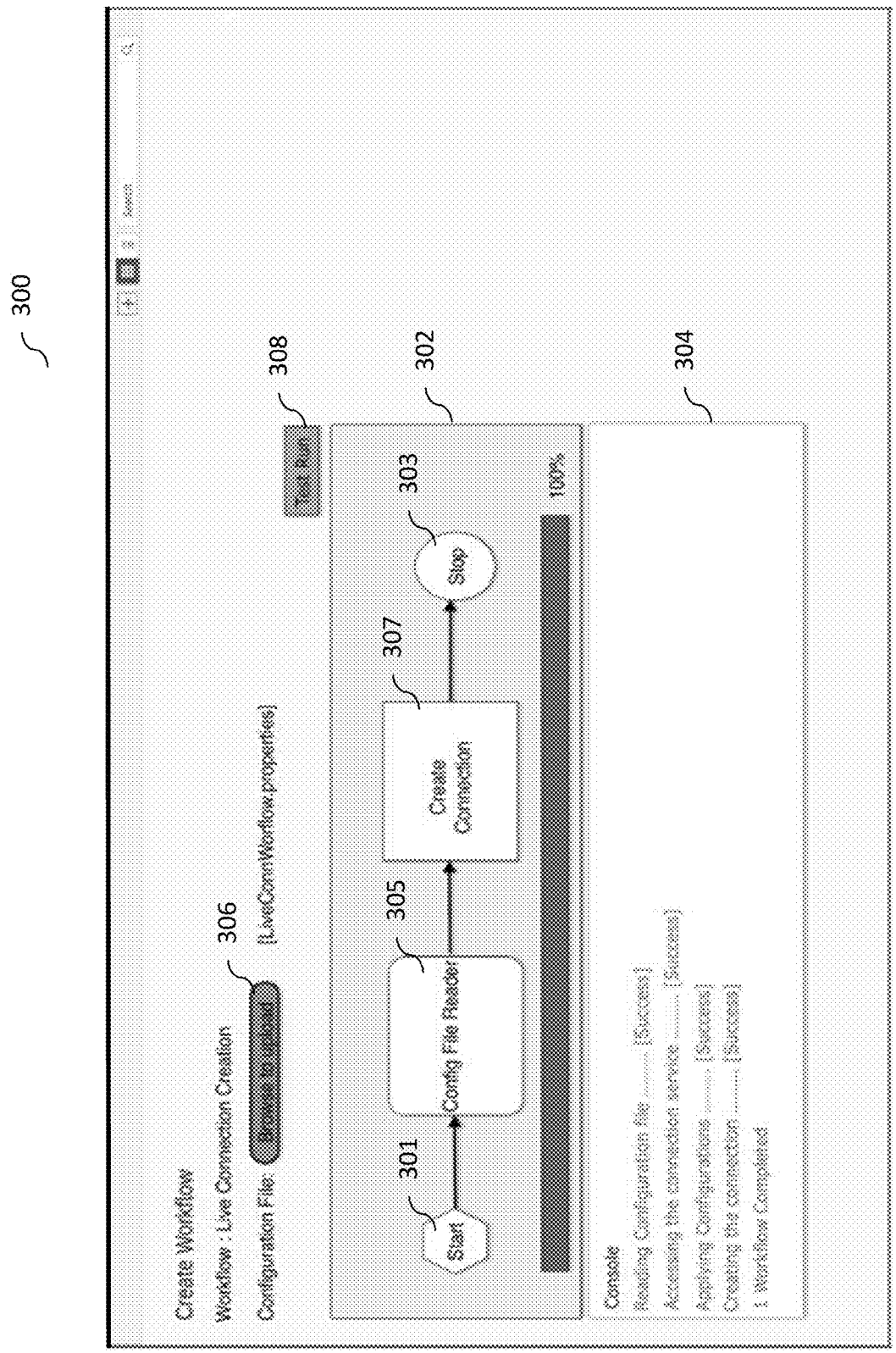
FIG. 3 illustrates an exemplary workflow interface, according to some implementations of the current subject matter.

Upon validation/verification/authentication of the configuration file, at 208, the workflow manager engine 104, using, for example, its workflow manager interface 116, may be configured to generate a workflow interface. FIG. 3 illustrates an exemplary workflow interface 300, according to some implementations of the current subject matter. The interface 300 may include a graphical representation 302 of the workflow with start and stop indicators 301 and 303, that may be assigned upon verification/validation/authentication of one or more parameters, APIs, etc. of the configuration file 110, at 210 (as shown in FIG. 2). The start and stop indicators 301, 303 may be configured to correspond to identifiers corresponding to the beginning and ending, respectively, of the execution of the generated workflow pipeline. Additionally, graphical indicators 305 and 307 may illustrate exemplary steps that may be involved in a pipeline. As shown in FIG. 3, the graphical indicator 305 may correspond to the reading of the configuration file and graphical indicator 307 may correspond to creation of a connection.

Further the interface 300 may be configured to include a graphical representation or console 304 including one or messages illustrating various steps that are being performed during workflow generation, verification/validation/authentication, etc. (e.g., "Reading Configuration file", "Accessing the connection service", "Applying Configuration", "Creating the connection", "Workflow Completed", etc.). Each such message may be indicative of an action that may be executed by the workflow manager engine 104 during generation of a workflow. A success/failure indicator (e.g., "Success", "Fail", etc.) may be displayed next to the specific step that has been executed by the engine 104. One or more steps displayed in the console 304 may correspond to one or more operations in the process 200 shown in FIG. 2.

As shown in FIG. 3, one or more graphical buttons may be included in the interface 300 that may correspond to various options. For example, button 306 may be configured, upon clicking or pressing on it, to request downloading of a configuration file 110. Another button 308 may be configured, upon clicking or pressing on it, to execute testing of the workflow and/or one or more configuration parameters. The testing may be executed automatically, such as, for example, upon detection of completion of the workflow generation, and/or manually, e.g., by an administrator user 102.

Figure 4:
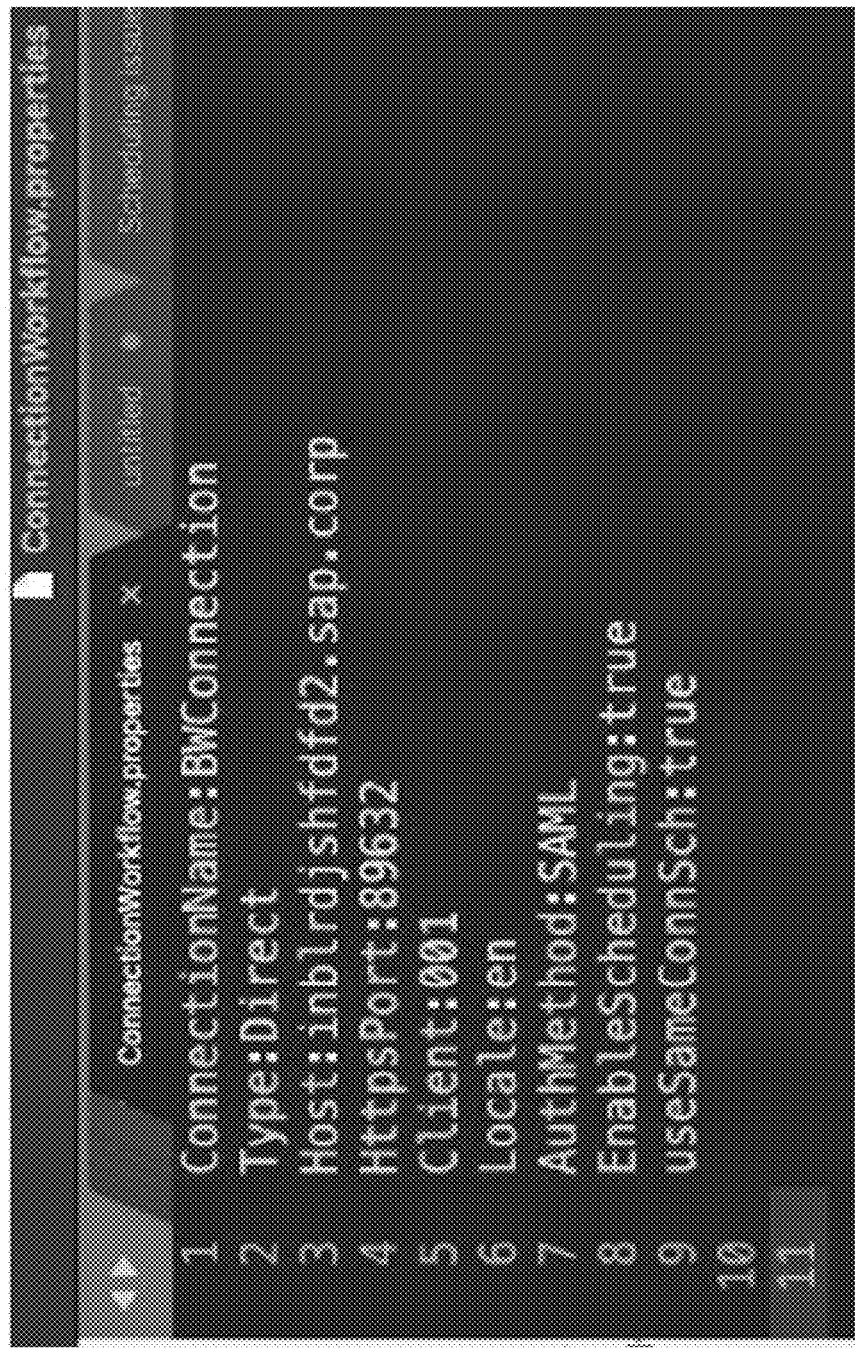
FIG. 4 illustrates an exemplary connection object, according to some implementations of the current subject matter.

Referring back to FIG. 2, the workflow manager engine 104 may be configured to generate one or more connection objects for connecting the workflow to one or more data sources (e.g., data source 106 as shown in FIG. 1). The connection objects may include one or more APIs, protocols (e.g., REST protocols, etc.), and/or any other connection objects. FIG. 4 illustrates an exemplary connection object 400, according to some implementations of the current subject matter. The connection object 400 may be configured to one or more specific connection properties. For example, the connection properties may include a connection name (e.g., "BWConnection"), a type of connection (e.g., "Direct"), a host (e.g., "inblrdjshfdfd2.sap.corp"), an HTTPS port number (e.g., "89632"), a client identifier (e.g., "001"), a locale identifier (e.g., "en" for English), a connection authentication method "AuthMethod" (e.g., "SAML"), a Boolean value for scheduling identifier "EnableScheduling" (e.g., "true"), and a Boolean value for indication of whether same connection scheduling may be used "useSameConnSch") (e.g., "true"). As can be understood, other connection properties may be used. The connection may be tested prior (e.g., using button 308 shown in FIG. 3).

Upon completion of the workflow and the connection object setup, the workflow may be generated, at 214, as shown in FIG. 2. The generated workflow may be tested (e.g., using button 308 shown in FIG. 3). If the testing of the workflow results in any errors, the errors may need to be fixed prior to workflow being implemented. Upon satisfactory completion of testing (e.g., no errors), the workflow may be saved to the storage location 106 (shown in FIG. 1). Additionally, the workflow, the connection object and/or any other configuration data, parameters, etc. may be saved as a workflow template 108. The template 108 may be stored by the workflow manager engine 104 and/or stored at the storage location 106.

Figure 5:
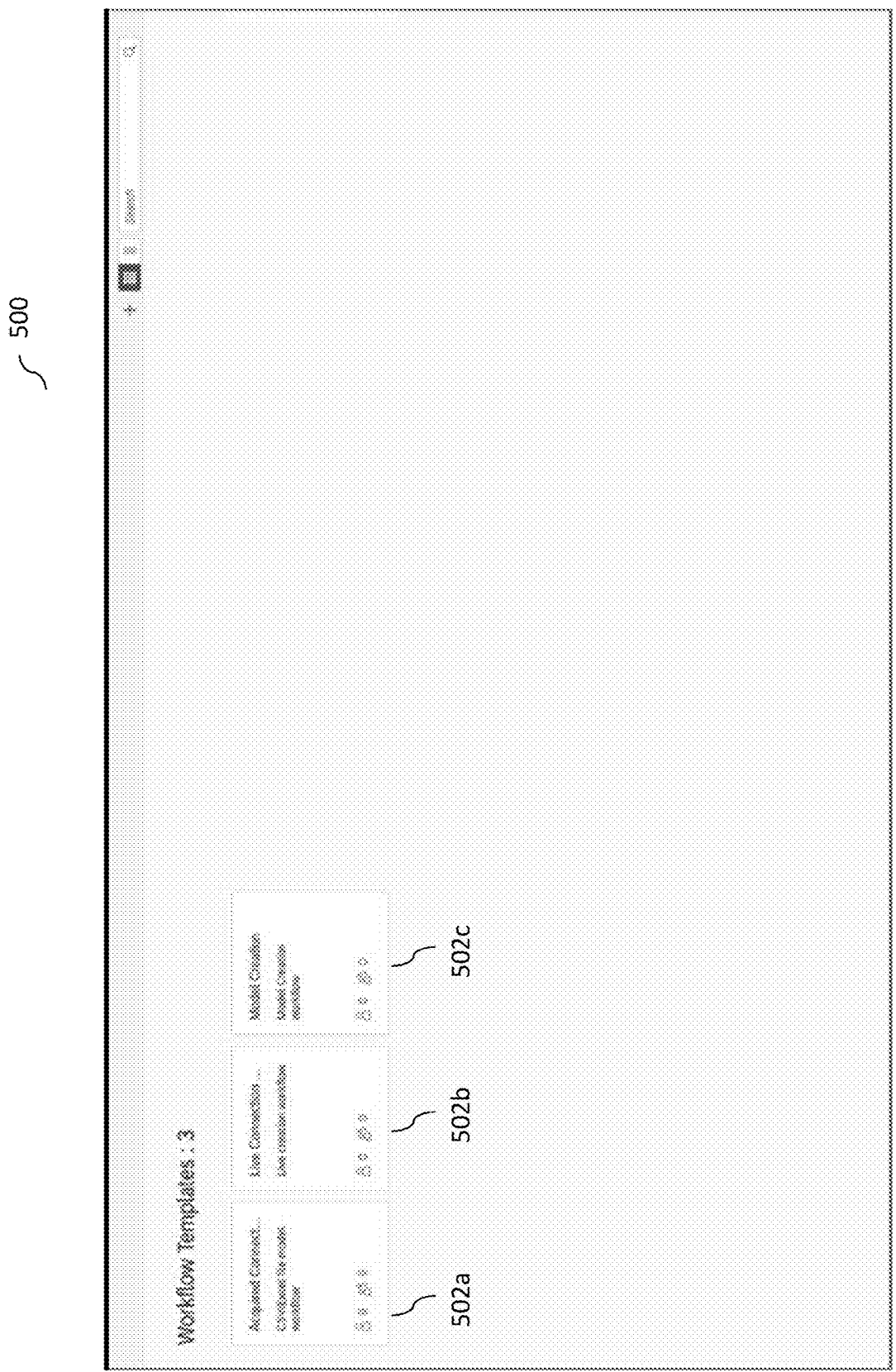
FIG. 5 illustrates an exemplary workflow list(s) interface, according to some implementations of the current subject matter.

FIG. 5 illustrates an exemplary workflow list(s) interface 500, according to some implementations of the current subject matter. The workflow list(s) interface 500 may be configured to be displayed by the workflow manager engine 104 (e.g., using its workflow manager interface 116). It may be used to graphically display one or more available workflows 502 (a, b, c). The workflows 502 may have been previously generated, such as, for example, using process 200 shown in FIG. 2, and may have been saved as one or more templates 108 (e.g., either by the workflow manager engine 104 and/or at the storage location 106). The workflows may each include a name, an identifier, and/or any other way to identify the workflows. The workflows 502 may be accessible to users 102 and/or may be used by the users 102 for performing various tasks. To access a particular workflow, the user 102 may issue a query. The query may identify a specific workflow (e.g., using workflow identifier). Alternatively, or in addition, the query may be a free text query (e.g., "find me procurement workflow"). If the user 102 is unable to select a desired workflow template 502 from the interface 500, a natural language processing query may be issued by the user 102 where the user 102 may speak (e.g., using a speaker) the user's query and transmit it to the workflow manager engine 104 for execution. For example, "Create model with live data source". This would search templates 502 using identifiers, tags, etc. which may have been added during workflow template generation process (e.g., process 200 shown in FIG. 2). The search may be configured to result in a "Live Connection Creation" workflow template 502b and "Model Creation" workflow template 502c. The workflow manager 104 may be configured to present the resulting workflow templates 502b, 502c in a correct sequence.

Figure 6:
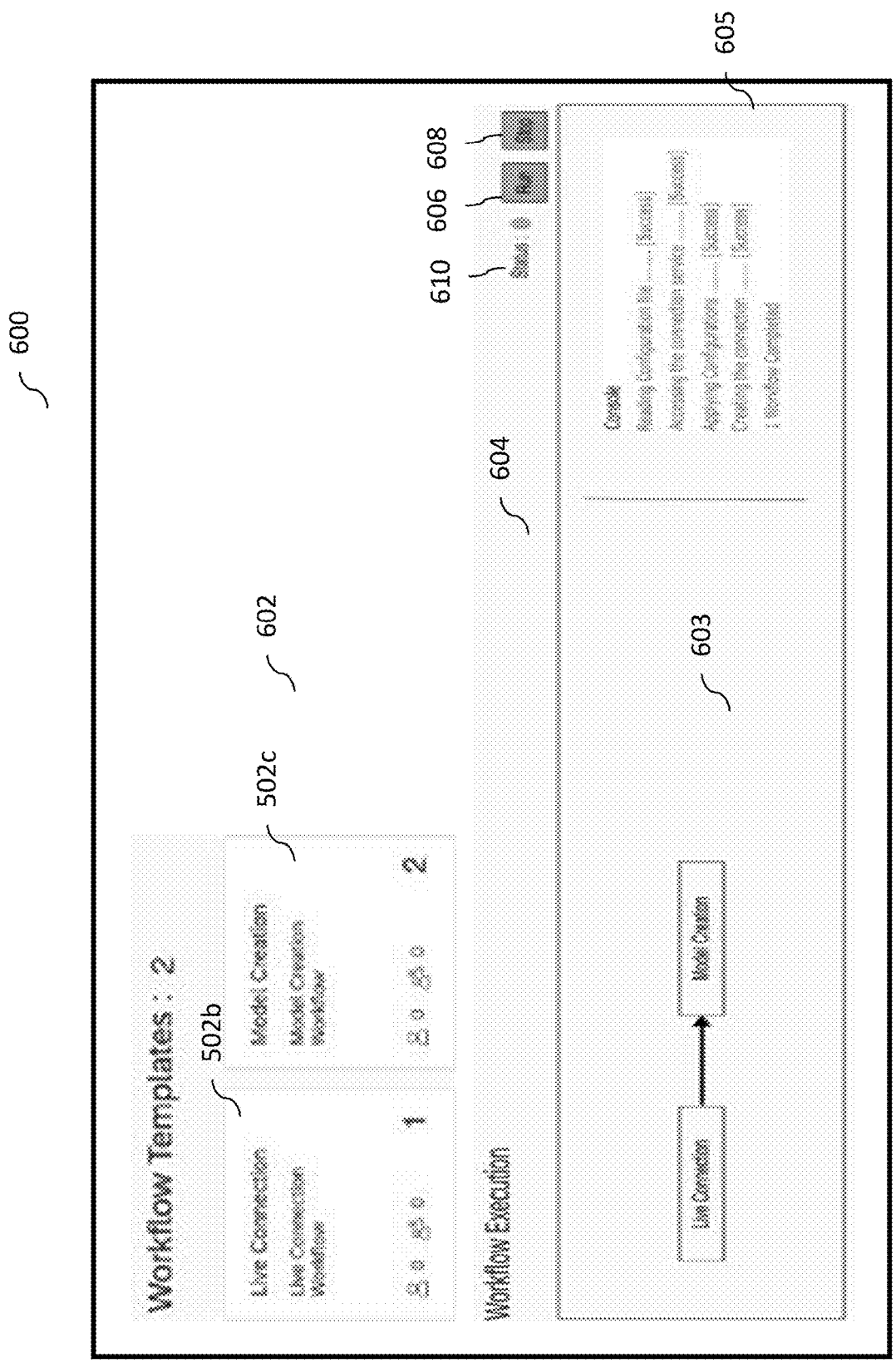
FIG. 6 illustrates an exemplary workflow execution interface, according to some implementations of the current subject matter.

FIG. 6 illustrates an exemplary workflow execution interface 600, according to some implementations of the current subject matter. The interface 600 may be configured to include a graphical area 602 displaying results of the search performed by the user 102 (e.g., workflow templates 502b, 502c along with an order using which the templates are to be executed (e.g., "1" for template 502b and "2" for template 502c)). It may also include a graphical area 604 that illustrate workflow execution processes. In particular, the graphical area 603 may illustrate the generated workflow execution flow (e.g., "Live Connection"→"Model Creation" in accordance with the order above). It may also include a graphical area 605 corresponding to a console that may indicate whether execution of various processes associated with the generated workflow have or have not been successful (e.g., similar to console 304 shown in FIG. 3). Buttons 606 (e.g., "Run") and 608 (e.g., "Stop") may be used to begin and stop, respectively, execution of the workflow. Further, a status indicator 610 may be used to indicate whether workflow has been executed successfully.

As can be understood, there are many technical advantages to the current subject matter workflow generation system. For example, the current subject matter may allow execution of multiple workflows in parallel with minimal changes. Further, dependencies of any workflows, for example, on other workflows, objects, configuration information, data, objects, connections, APIs, etc. may be resolved. Additionally, users may perform any functionality without domain (e.g., subject matter, specific workflow identifiers) knowledge, i.e., users may search for a workflow using any desired searching methodology.

Figure 7:
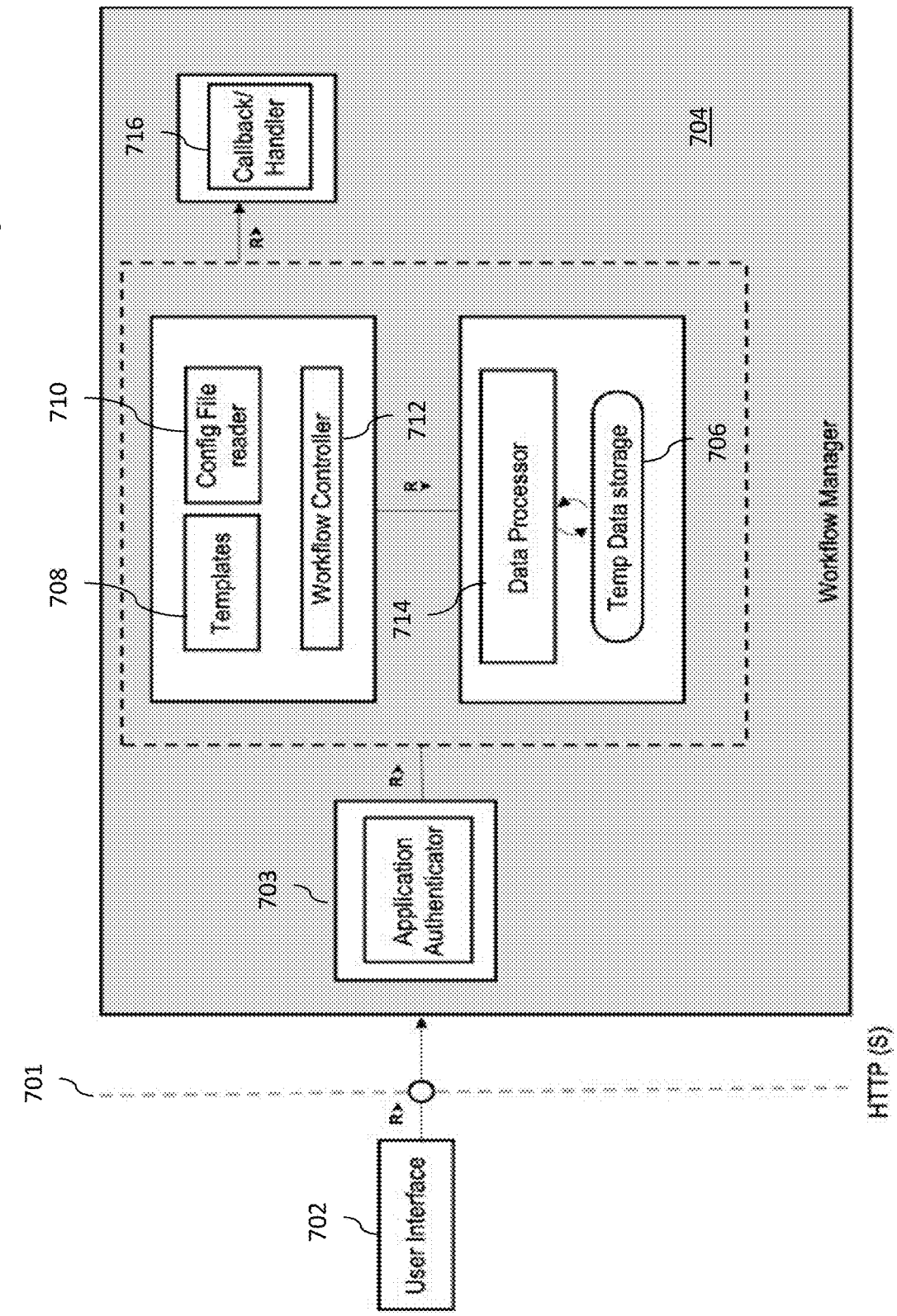
FIG. 7 illustrates an exemplary system for generating of workflows in computing systems, software applications, etc., according to some implementations of the current subject matter.

FIG. 7 illustrates an exemplary system 700 for generating of workflows in computing systems, software applications, etc., according to some implementations of the current subject matter. The system 700 may be configured to be similar to the system 100 shown in FIG. 1. The system 700 may be configured to operate in one or more clustered computing environments (e.g., Kubernetes), one or more cloud environments, etc. It may include one or more users, entities, applications, etc. that may use interface 702 to access a workflow manager engine/system 704 via a connection interface (e.g., HTTP(s)) 701. The engine 704 may include one or more computing elements (which may, for example, as discussed below, include one or more processors, one or more servers, one or more computing engines, one or more memory and/or storage locations, one or more databases, etc.) such as, an application authenticator 706, workflow templates 708, configuration file reader 710, workflow controller 714, a data processor 714, a temporary data storage 706, and a callback/handler 716. In generating a workflow for an end user, one or more of the computing elements in the engine 704 may be used. The authenticator 703 may be configured to authorize a user (e.g., using an authentication session object) for the purposes of generation and/or using a workflow. The workflow templates 708 may be generated for specific workflow (e.g., by a user, automatically, manually, etc.). The workflow controller 714 may be configured to control all transactions, communications, executions, etc. that may be occurring between various elements of the workflow manager 704 during generation, searching, using, etc. of a workflow. It may be configured to define one or more synchronous and/or asynchronous workflows executions. The workflow controller 712 may also be configured to forward various workflow data to the data processor 714, where the processor 714 may use the data for generation, modification, etc. of new workflows, existing workflows, and/or functionalities that may be associated with such workflows. The temporary data storage 706 may be configured to temporarily store data for data processing by the data processor 714. The callback handler 716 may be configured, e.g., for successful/failure workflow creation (as shown in FIGS. 3-6), to provide an event for the user to act upon. The configuration file reader 710 may be configured to receive and read a configuration file (as described above) for generation of a workflow.

The workflow manager engine 704 may include a processor, a memory, and/or any combination of hardware/software, and may be configured to generate a workflow that a user may wish to generate and/or use. The engine 704 may include one or more artificial intelligence and/or learning capabilities that may rely on and/or use various data, e.g., data related to and/or identifying one or more workflows that may have been previously generated.

The elements of the system 700 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Moreover, the elements of the system 700 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

In some implementations, to generate a particular workflow, the engine 704 may be configured to receive a request from the user concerning generation and/or use of one or more workflows via the interface 702. In some cases, the user may already know specific workflow(s) which the user may wish to use, and if such workflow already exists (e.g., stored in the storage location 706), the user may utilize one or more functionalities (e.g., graphical tabs, buttons, etc.) of the interface 702 to query, select and/or retrieve (e.g., from storage location 106) that workflow directly. If the workflow does not exist and/or the user is unsure which workflow the user wishes to utilize, the user may transmit a query (e.g., a search query) to the workflow manager 704, for example, via the interface 702, seeking user-desired workflow(s). The workflow manager 704 may be configured to generate a workflow using the processes described above with regard to FIGS. 2-6.

Figure 8:
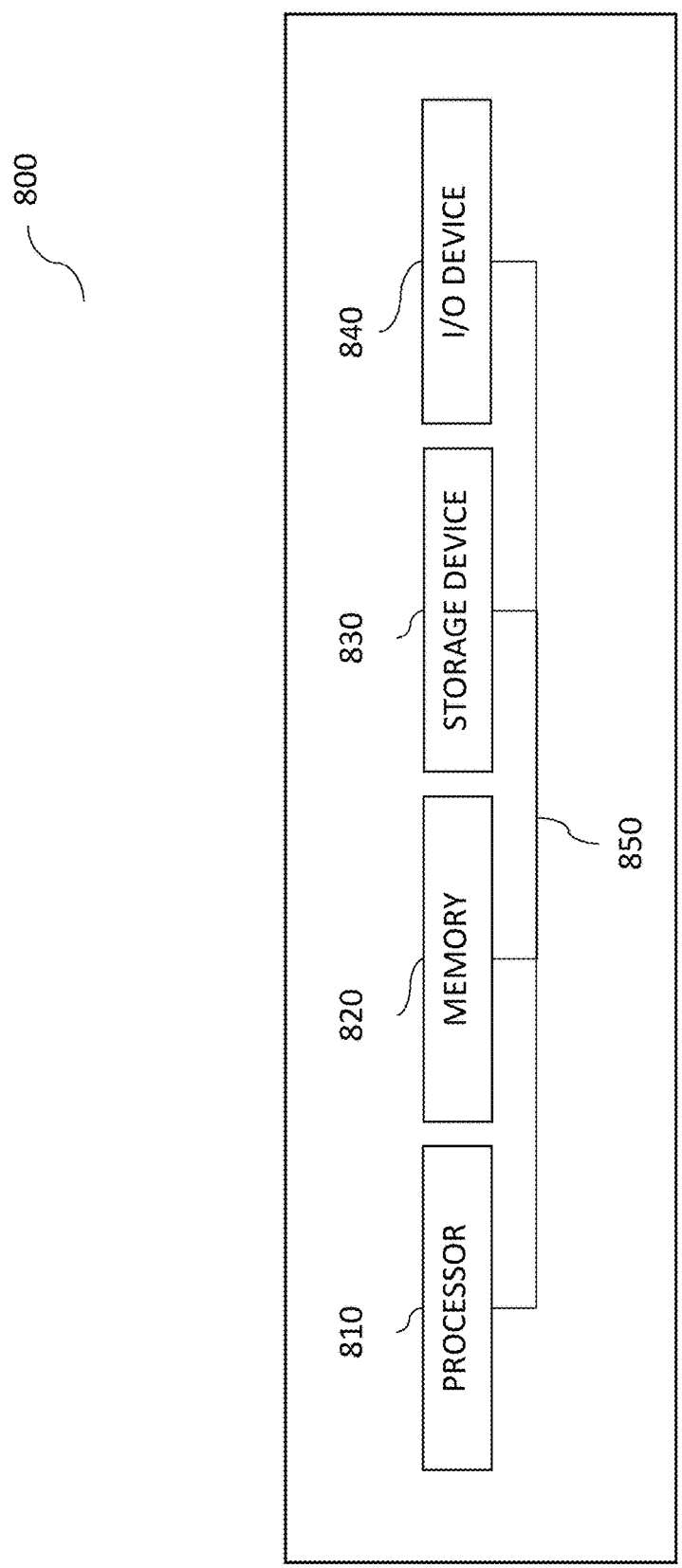
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
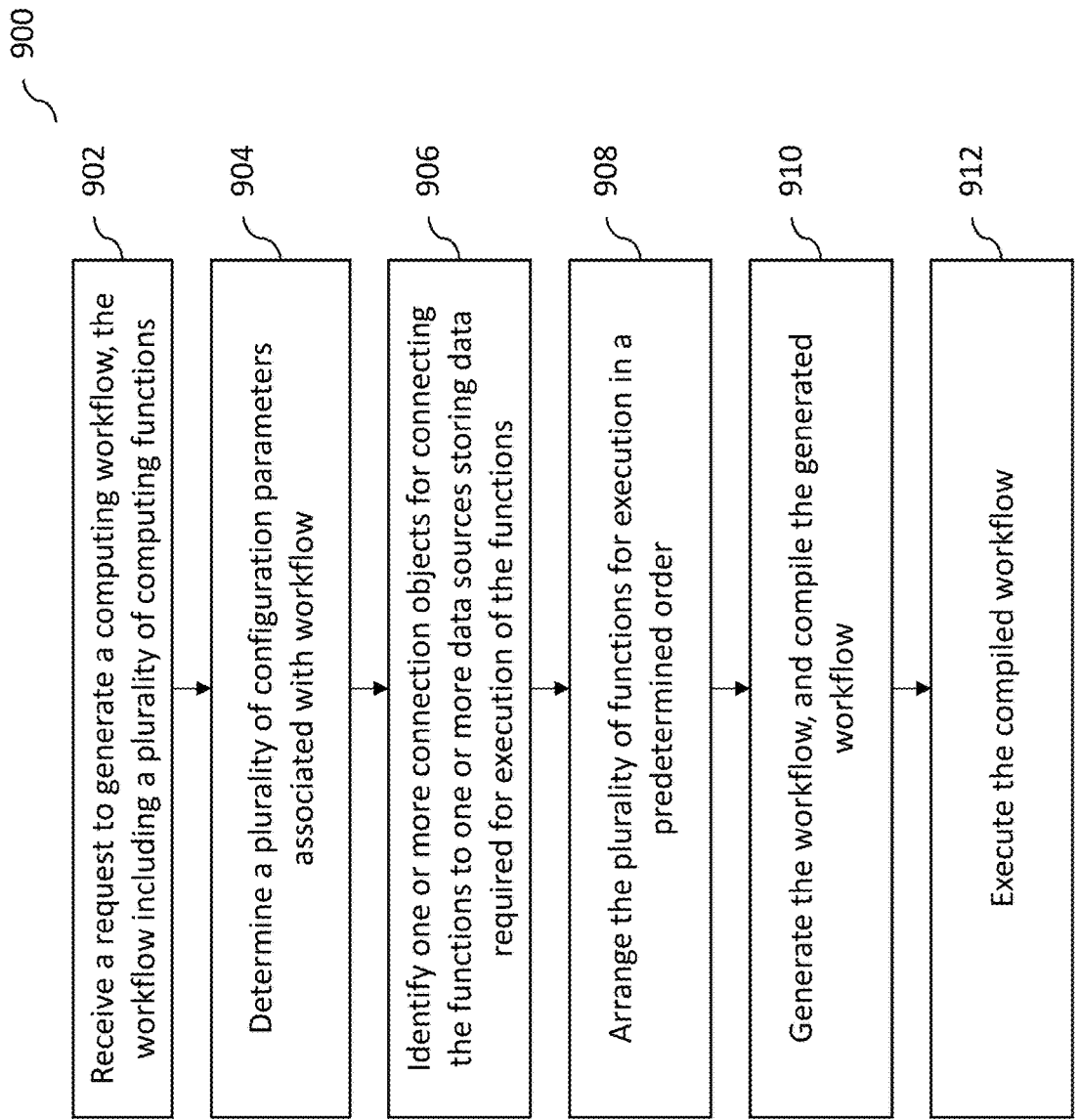
FIG. 9 illustrates an exemplary method, according to some implementations of the current subject matter.

FIG. 9 illustrates an exemplary method 900 for generating a workflow, according to some implementations of the current subject matter. The method 900 may be executed by the system 100 (shown in FIG. 1) and/or system 700, as shown in FIG. 7. The method 900 may implement the techniques discussed above in connection with FIGS. 1-7.

At 902, a request to generate a computing workflow may be received. The workflow may include a plurality of computing functions. The request may be received from one or more users 102 (as shown in FIG. 1) and/or via one or more interfaces 701 (as shown in FIG. 7).

At 904, a plurality of configuration parameters associated with workflow may be determined based on the received request. The configuration parameters may be represented as a key-value pair and may define one or more properties of one or more functions in the workflow. The plurality of configuration parameters may be configured to define a configuration of execution of one or more functions in the plurality of functions.

At 906, one or more connection objects for connecting the functions to one or more data sources storing data required for execution of the functions may be identified. An exemplary connection object is illustrated in FIG. 4.

At 908, the plurality of functions may be arranged for execution in a predetermined order using the determining plurality of configuration parameters and identified one or more connection objects. The predetermined order may be specified using one or more configuration parameters in the plurality of configuration parameters. An exemplary order is illustrated in FIG. 6, where workflow function 502c follows workflow function 502b.

At 910, the workflow may be generated based on the arranging and compiled. At 912, the compiled workflow may be executed.

In some implementations, the current subject matter may include one or more of the following optional features. The method may include validating each configuration parameter in the plurality of configuration parameters. The validation/verification process is discussed above with regard to operation 206 shown in FIG. 2.

In some implementations, the method 900 may be configured to perform assigning a start identifier and an end identifier to the generated workflow, as discussed above with regard to operation 210 shown in FIG. 2. This process may be performed upon completion of validation/verification of the configuration parameters.

Each configuration parameter may be configured to include a key-value pair. A key in the key-value pair may identify one or more computing functions in the plurality of computing functions. A value in the key value pair may identify one or more values associated with execution of the one or more computing functions.

In some implementations, the request may be received using at least one of the following: a query, a free text query, a natural language processing query, a workflow identifier, and any combination thereof. The generated workflow may be stored as a template workflow (e.g., as shown in FIG. 5). The method may include executing the template workflow in response to receiving another request to generate another computing workflow.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a request to generate a workflow, the workflow including a plurality of functions;
   determining, based on the received request, a plurality of configuration parameters associated with the workflow, the plurality of configuration parameters defining a configuration of execution of one or more functions in the plurality of functions;
   identifying one or more connection objects for connecting the one or more functions to one or more data sources storing data required for execution of the one or more functions;

arranging, using the determined plurality of configuration parameters and the identified one or more connection objects, the plurality of functions for execution in a predetermined order, the predetermined order being specified using one or more configuration parameters in the plurality of configuration parameters;

generating, based on the arranging, the workflow, and compiling the generated workflow; and executing the compiled workflow.

2. The method according to claim 1, further comprising validating each configuration parameter in the plurality of configuration parameters.

3. The method according to claim 1, further comprising assigning a start identifier and an end identifier to the generated workflow.

4. The method according to claim 1, wherein each configuration parameter includes a key-value pair, where a key in the key-value pair identifies one or more functions in the plurality of functions, and a value in the key-value pair identifies one or more values associated with execution of the one or more functions.

5. The method according to claim 1, wherein the request is received using at least one of the following: a query, a free text query, a natural language processing query, a workflow identifier, and any combination thereof.

6. The method according to claim 1, further comprising storing the generated workflow as a template workflow.

7. The method according to claim 6, wherein the executing further comprises executing the template workflow in response to receiving another request to generate another workflow.

8. A system comprising:
at least one programmable processor; and
a non-transitory machine-readable medium storing instructions that, when executed by the at least one programmable processor, cause the at least one programmable processor to perform operations comprising:
receiving a request to generate a workflow, the workflow including a plurality of functions;
determining, based on the received request, a plurality of configuration parameters associated with the workflow, the plurality of configuration parameters defining a configuration of execution of one or more functions in the plurality of functions;
identifying one or more connection objects for connecting the one or more functions to one or more data sources storing data required for execution of the one or more functions;
arranging, using the determined plurality of configuration parameters and the identified one or more connection objects, the plurality of functions for execution in a predetermined order, the predetermined order being specified using one or more configuration parameters in the plurality of configuration parameters;
generating, based on the arranging, the workflow, and compiling the generated workflow; and
executing the compiled workflow.

9. The system according to claim 8, wherein the operations further comprise validating each configuration parameter in the plurality of configuration parameters.

10. The system according to claim 8, wherein the operations further comprise assigning a start identifier and an end identifier to the generated workflow.

11. The system according to claim 8, wherein each configuration parameter includes a key-value pair, where a key in the key-value pair identifies one or more functions in the plurality of functions, and a value in the key-value pair identifies one or more values associated with execution of the one or more functions.

12. The system according to claim 8, wherein the request is received using at least one of the following: a query, a free text query, a natural language processing query, a workflow identifier, and any combination thereof.

13. The system according to claim 8, wherein the operations further comprise storing the generated workflow as a template workflow.

14. The system according to claim 13, wherein the executing further comprises executing the template workflow in response to receiving another request to generate another workflow.

15. A computer program product comprising a non-transitory machine-readable medium storing instructions that, when executed by at least one programmable processor, cause the at least one programmable processor to perform operations comprising:
receiving a request to generate a workflow, the workflow including a plurality of functions;
determining, based on the received request, a plurality of configuration parameters associated with the workflow, the plurality of configuration parameters defining a configuration of execution of one or more functions in the plurality of functions;
identifying one or more connection objects for connecting the one or more functions to one or more data sources storing data required for execution of the one or more functions;
arranging, using the determined plurality of configuration parameters and the identified one or more connection objects, the plurality of functions for execution in a predetermined order, the predetermined order being specified using one or more configuration parameters in the plurality of configuration parameters;
generating, based on the arranging, the workflow, and compiling the generated workflow; and
executing the compiled workflow.

16. The computer program product according to claim 15, wherein the operations further comprise validating each configuration parameter in the plurality of configuration parameters.

17. The computer program product according to claim 15, wherein the operations further comprise assigning a start identifier and an end identifier to the generated workflow.

18. The computer program product according to claim 15, wherein each configuration parameter includes a key-value pair, where a key in the key-value pair identifies one or more functions in the plurality of functions, and a value in the key-value pair identifies one or more values associated with execution of the one or more functions.

19. The computer program product according to claim 15, wherein the request is received using at least one of the following: a query, a free text query, a natural language processing query, a workflow identifier, and any combination thereof.

20. The computer program product according to claim 15, wherein the operations further comprise storing the generated workflow as a template workflow; wherein the executing further comprises executing the template workflow in response to receiving another request to generate another workflow.

* * * * *